United States Patent
Gollier et al.

(10) Patent No.: US 11,619,774 B2
(45) Date of Patent: Apr. 4, 2023

(54) TALBOT PATTERN ILLUMINATOR AND DISPLAY BASED THEREON

(71) Applicant: META PLATFORMS TECHNOLOGIES, LLC, Menlo Park, CA (US)

(72) Inventors: Jacques Gollier, Sammamish, WA (US); Fenglin Peng, Redmond, WA (US); Alexander Koshelev, Redmond, WA (US); Giuseppe Calafiore, Redmond, WA (US); Lu Lu, Kirkland, WA (US); Ying Geng, Bellevue, WA (US); Yun-Han Lee, Redmond, WA (US)

(73) Assignee: Meta Platforms Technologies LLC, Menlo Park, CA (US)

( * ) Notice: Subject to any disclaimer, the term of this patent is extended or adjusted under 35 U.S.C. 154(b) by 0 days.

(21) Appl. No.: 17/383,245

(22) Filed: Jul. 22, 2021

(65) Prior Publication Data
US 2023/0021670 A1 Jan. 26, 2023

(51) Int. Cl.
| G02B 5/32 | (2006.01) |
| F21V 8/00 | (2006.01) |
| G02B 6/12 | (2006.01) |
| G02B 27/09 | (2006.01) |
| G02B 6/124 | (2006.01) |
| G02B 6/125 | (2006.01) |

(Continued)

(52) U.S. Cl.
CPC .............. *G02B 5/32* (2013.01); *G02B 6/005* (2013.01); *G02B 6/0031* (2013.01);
(Continued)

(58) Field of Classification Search
CPC ............ G02B 6/12004; G02B 6/12007; G02B 6/124; G02B 6/125; G02B 6/2804
See application file for complete search history.

(56) References Cited

U.S. PATENT DOCUMENTS

| 6,124,974 A | 9/2000 | Burger |
| 9,057,824 B2 | 6/2015 | Gollier et al. |

(Continued)

FOREIGN PATENT DOCUMENTS

| JP | 201982700 | 5/2019 |
| KR | 2018-0050453 | 5/2018 |

OTHER PUBLICATIONS

Teng et al, Uniform theory of the Talbot effect with partially coherent light illumination, vol. 20, No. 9/Sep. 2003/J. Opt. Soc. Am. A, pp. 1747-1754 (Year: 2003).*

(Continued)

*Primary Examiner* — Keith G. Delahoussaye
(74) *Attorney, Agent, or Firm* — Pequignot + Myers; Matthew A. Pequignot

(57) ABSTRACT

An illuminator for a display panel includes a light source for providing a light beam and a lightguide coupled to the light source for receiving and propagating the light beam along the substrate. The lightguide includes an array of out-coupling gratings that runs parallel to the array of pixels for out-coupling portions of the light beam from the lightguide such that the out-coupled light beam portions propagate through the substrate and produce an array of optical power density peaks at the array of pixels due to Talbot effect. A period of the array of peaks is an integer multiple of a pitch of the array of pixels.

20 Claims, 13 Drawing Sheets

(51) Int. Cl.
*G02B 27/01* (2006.01)
*G02B 5/18* (2006.01)

(52) U.S. Cl.
CPC ......... *G02B 6/0035* (2013.01); *G02B 6/0076* (2013.01); *G02B 6/12004* (2013.01); *G02B 6/124* (2013.01); *G02B 6/125* (2013.01); *G02B 6/12007* (2013.01); *G02B 27/017* (2013.01); *G02B 27/0944* (2013.01); *G02B 27/0994* (2013.01); *G02B 5/18* (2013.01); *G02B 6/0036* (2013.01)

(56) References Cited

U.S. PATENT DOCUMENTS

| | | | |
|---|---|---|---|
| 11,378,729 B2* | 7/2022 | Fattal | G02B 6/0038 |
| 11,428,860 B2* | 8/2022 | Fattal | G02B 27/4205 |
| 2006/0146414 A1 | 7/2006 | Cho et al. | |
| 2012/0228475 A1 | 9/2012 | Pang et al. | |
| 2017/0090096 A1* | 3/2017 | Fattal | G02B 6/002 |
| 2018/0164627 A1 | 6/2018 | Oh | |
| 2018/0299678 A1* | 10/2018 | Singer | G02B 6/005 |
| 2019/0317265 A1* | 10/2019 | Fattal | G02B 6/003 |
| 2020/0012034 A1* | 1/2020 | Fattal | G02B 6/0035 |
| 2021/0390914 A1* | 12/2021 | Fattal | G02F 1/133615 |
| 2022/0236486 A1* | 7/2022 | Munoz | G02B 6/2804 |

OTHER PUBLICATIONS

International Search report and Written Opinion for International Application No. PCT/US2022/038054, dated Nov. 23, 2022, 14 pages.

* cited by examiner

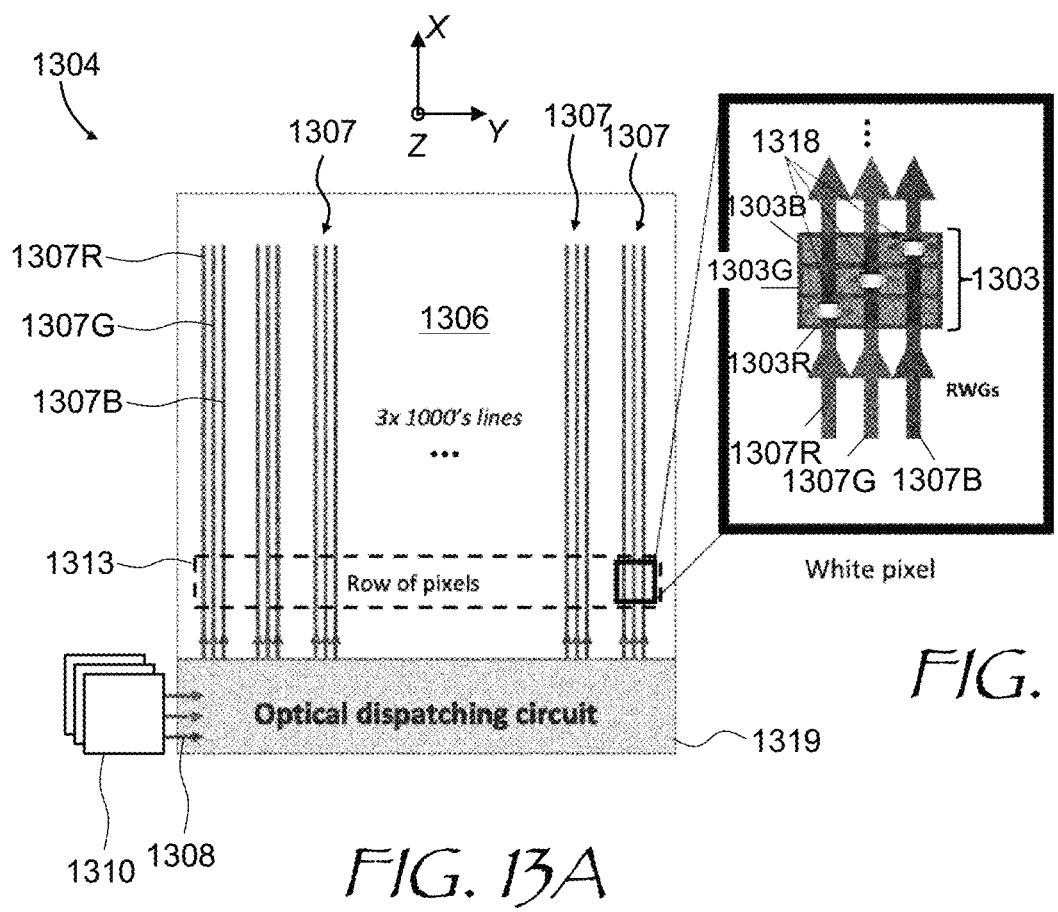
FIG. 13A
FIG. 13B
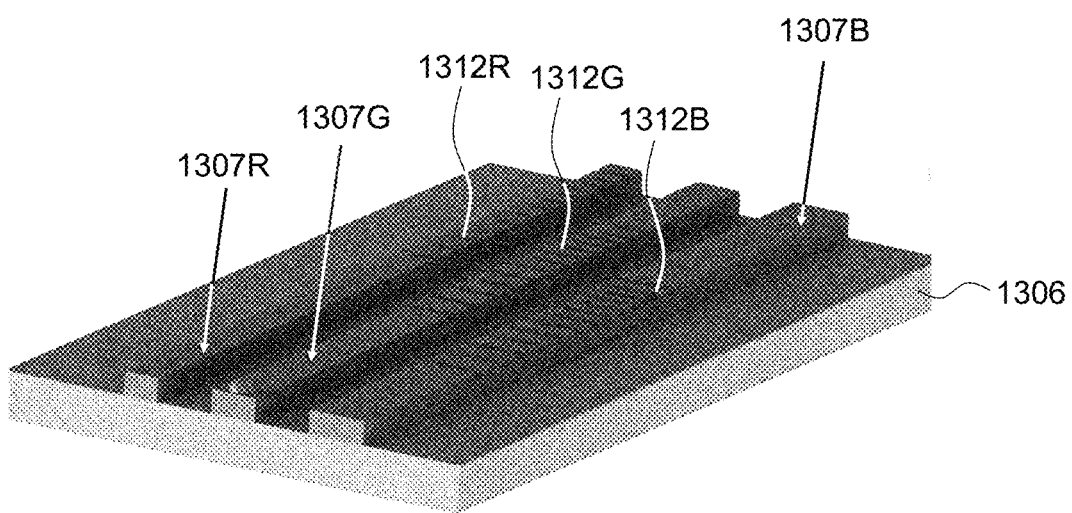
FIG. 13C

TALBOT PATTERN ILLUMINATOR AND DISPLAY BASED THEREON

TECHNICAL FIELD

The present disclosure relates to display devices and illuminators suitable for use in display devices.

BACKGROUND

Visual displays are used to provide information to viewer(s) including still images, video, data, etc. Visual displays have applications in diverse fields including entertainment, education, engineering, science, professional training, advertising, to name just a few examples. Some visual displays, such as TV sets, display images to several users, and some visual display systems are intended for individual users. Visual displays are viewed either directly, or by means of special glasses that may include optical shutters, as well as special varifocal lenses.

An artificial reality system generally includes a near-eye display (e.g., a headset or a pair of glasses) configured to present content to a user. A near-eye display may display virtual objects or combine images of real objects with virtual objects, as in virtual reality (VR), augmented reality (AR), or mixed reality (MR) applications. For example, in an AR system, a user may view images of virtual objects (e.g., computer-generated images (CGIs)) superimposed onto surrounding environment.

It is desirable to reduce size and weight of a head-mounted display. Lightweight and compact near-eye displays reduce the strain on user's head and neck, and are generally more comfortable to wear. Oftentimes, an optics block of a wearable display is the bulkiest and heaviest module of the display, especially when the optics block includes bulk optics such as refractive lenses and cube beamsplitters. Compact planar optical components, such as waveguides, gratings, Fresnel lenses, etc., may be used to reduce the size and weight of the optics block. However, compact planar optics may have low efficiency, image distortions, ghosting, residual coloring, rainbow effects, etc., which hinders their use in wearable optical display systems.

BRIEF DESCRIPTION OF THE DRAWINGS

Exemplary embodiments will now be described in conjunction with the drawings, in which:

FIG. 13A is a top schematic view of a multi-color PIC illuminator implementation with surface-relief gratings on linear waveguides;

FIG. 13B is a top schematic view of a portion of the PIC light source of FIG. 13A superimposed with a single RGB pixel of a display panel;

FIG. 13C is a three-dimensional schematic view of linear waveguides of the PIC light source of FIG. 13A;

DETAILED DESCRIPTION

Figure 1A:
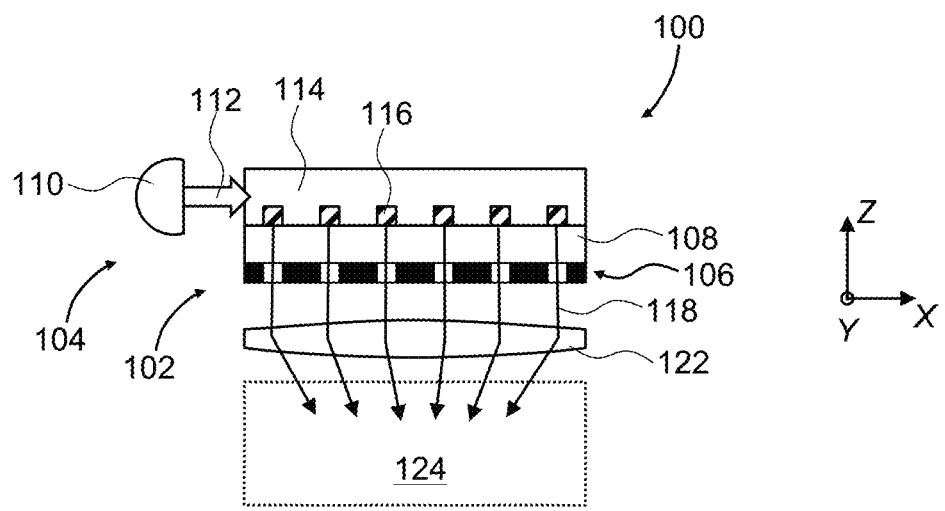
FIG. 1A is a schematic cross-sectional view of a display device of this disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

In a visual display including a panel of transmissive pixels coupled to an illuminator, the efficiency of light utilization depends on a ratio of a geometrical area occupied by pixels to a total area of the display panel. For miniature displays often used in near-eye and/or head-mounted displays, the ratio can be lower than 50%. The efficient illuminator utilization can be further hindered by color filters on the display panel which on average transmit no more than 30% of incoming light. On top of that, there may exist a 50% polarization loss for polarization-based display panels such as liquid crystal (LC) display panels. All these factors considerably reduce the light utilization and overall wall plug efficiency of the display, which is undesirable.

In accordance with this disclosure, the light utilization and the wall plug efficiency of a backlit display may be improved by providing an illuminator that generates an array of light points matching the locations of the transmissive pixels of the display panel. Since the illuminating light is concentrated in areas of pixels, and accordingly inter-pixel areas receive less light, the overall wall plug efficiency of the display can be improved. The array of light points, or peaks in a lateral distribution of optical power density, may be provided by utilizing Talbot effect that re-generates a periodic optical power density distribution at an illuminator at a distance from the illuminator equal to a Talbot length. Talbot light patterns may be created separately for red, green, and blue illuminating light, obviating a need for a color filter array in the display panel.

In accordance with the present disclosure, there is provided a display device comprising a display panel including an array of pixels on a substrate and an illuminator for illuminating the display panel. The illuminator includes a light source for providing a light beam and a lightguide coupled to the light source for receiving and propagating the light beam along the substrate. The lightguide includes a first array of out-coupling gratings. The first array runs parallel to the array of pixels for out-coupling portions of the light beam from the lightguide such that the out-coupled light beam portions propagate through the substrate and produce an array of optical power density peaks at the array of pixels due to Talbot effect. A period of the array of optical power density peaks is M times p, where p is a pitch of the array of pixels, and M is an integer ≥1. A first pitch $T_1$ of the first array of out-coupling gratings may be M times p. A distance D from a plane comprising the first array of out-coupling gratings to a plane comprising the array of pixels may be defined as $D=K (T_1)^2/(N \lambda)$, where K and N are integers ≥1, and $\lambda$ is a wavelength of the light beam in the substrate. In embodiments where the first array of out-coupling gratings is disposed at a surface of the illuminator joining the substrate, the distance D may be equal to a thickness of the substrate. Gratings of the first array of out-coupling gratings may be configured to focus or defocus the out-coupled portions of the light beam.

In some embodiments, the lightguide comprises a first plate for propagating at least a portion of the light beam in the lightguide by a series of total internal reflections between opposed parallel surfaces of the first plate. The lightguide may include an array of redirecting gratings for redirecting portions of the light beam for spreading the light beam within the first plate. The gratings may include volume hologram gratings, for example. The lightguide may further include a second plate for propagating at least a portion of the light beam therein by a series of total internal reflections between opposed parallel surfaces of the second plate. The first and second plates may be optically coupled together along their parallel surfaces.

The display device may further include a tiltable reflector in an optical path between the light source and the first plate. The tiltable reflector may be configured to couple the light beam into the first plate at an angle variable by tilting the tiltable reflector. Positions of the optical power density peaks at the array of pixels may be adjusted relative to pixels of the array of pixels by tilting the tiltable reflector. A controller may be operably coupled to the tiltable reflector for tilting the tiltable reflector to shift the array of optical power density peaks at the array of pixels by an integer multiple of the pitch p of the array of pixels.

The light source may be configured to provide first, second, and third light beam components at first, second, and third wavelengths respectively. For such embodiments, the lightguide may further include second and third arrays of out-coupling gratings optically coupled to the first plate. The first, second, and third arrays of out-coupling gratings may run parallel to the array of pixels at different distances from the array of pixels, for wavelength-selective out-coupling of portions of the first, second, and third light beam components respectively for illuminating the array of pixels through the substrate.

In some embodiments, the lightguide includes an optical dispatching circuit coupled to the light source for receiving and splitting the light beam into a plurality of sub-beams, and a first array of linear waveguides coupled to the optical dispatching circuit for receiving the sub-beams from the optical dispatching circuit. The linear waveguides may run parallel to one another to propagate the sub-beams along the array of pixels. The out-coupling gratings of the first array may be optically coupled to linear waveguides of the first array of linear waveguides. In embodiments where the light source is configured to provide first, second, and third components of the light beam for carrying light at first, second, and third wavelengths respectively, the optical dispatching circuit may be configured for receiving and splitting each one of the first, second, and third light beam components into a plurality of sub-beams. The first array of linear waveguides may be configured for receiving sub-beams of the first light beam component. The lightguide may further include second and third arrays of linear waveguides coupled to the optical dispatching circuit for receiving sub-beams of the second and third light beam components, respectively, from the optical dispatching circuit. The linear waveguides of the second and third arrays may run parallel one another to propagate the sub-beams along the array of pixels. The lightguide may further include second and third arrays of out-coupling gratings optically coupled to the second and third arrays of linear waveguides, respectively, for out-coupling portions of the second and third light beam components, respectively, for illuminating the array of pixels through the substrate. The lightguide may further include a color-selective reflector in an optical path between the first, second, and third arrays of out-coupling gratings and the substrate of the display panel. The color-selective reflector may be configured to provide different optical path lengths for the first, second, and third light beam components, to make sure that Talbot fringes for all wavelengths are on a same plane corresponding to the plane of the array of pixels.

In accordance with the present disclosure, there is provided an illuminator comprising a light source for providing a light beam. A plate may be configured for propagating at least a portion of the light beam therein by a series of total internal reflections between opposed parallel surfaces of the plate. A tiltable reflector may be disposed in an optical path between the light source and plate and configured to couple the light beam into the plate at a variable in-coupling angle. A first array of out-coupling gratings may be optically coupled to the plate for out-coupling portions of the light beam at an out-coupling angle depending on the in-coupling angle such that the light beam portions form an array of optical power density peaks due to Talbot effect at a Talbot plane spaced apart from the plate, positions of the peaks at the Talbot plane depending on the out-coupling angle of the light beam portions.

In embodiments where the light source is configured to provide first, second, and third components of the light beam for carrying light at first, second, and third wavelengths respectively, the plate may further include second and third arrays of out-coupling gratings optically coupled to the plate. The first, second, and third arrays of out-coupling gratings run parallel to one another for wavelength-selective out-coupling of portions of the first, second, and third light beam components respectively, to form an array of optical power density peaks due to Talbot effect at the Talbot plane at the first, second, and third wavelengths, respectively. Positions of the optical power density peaks at the first, second, and third wavelengths depend on the out-coupling angle of the light beam portions of the first, second, and third light beam components respectively. The first, second, and third arrays of out-coupling gratings may include volume gratings in some embodiments. The volume gratings of the first, second, and third arrays of out-coupling gratings may be disposed at different depth levels in the plate.

In accordance with the present disclosure, there is further provided an illuminator comprising a light source for providing a light beam, and a lightguide. The lightguide includes an optical dispatching circuit coupled to the light source for receiving and splitting the light beam into a plurality of sub-beams, and a first array of linear waveguides coupled to the optical dispatching circuit for receiving the sub-beams from the optical dispatching circuit. The linear waveguides run parallel to one another to propagate the sub-beams in the linear waveguides. The lightguide further includes a first array of out-coupling gratings optically coupled to linear waveguides of the first array of linear waveguides for out-coupling portions of the sub-beams to form an array of optical power density peaks due to Talbot effect at a Talbot plane spaced apart from the first array of out-coupling gratings.

In embodiments where the light source is configured to provide first, second, and third components of the light beam for carrying light at first, second, and third wavelengths, respectively, the optical dispatching circuit may be configured for receiving and splitting each one of the first, second, and third light beam components into a plurality of sub-beams. The first array of linear waveguides may be configured for receiving sub-beams of the first light beam component. The lightguide may further include second and third arrays of linear waveguides coupled to the optical dispatching circuit for receiving sub-beams of the second and third light beam components, respectively, from the optical dispatching circuit. The linear waveguides of the second and third arrays may run parallel one another to propagate the sub-beams. The lightguide may further include second and third arrays of out-coupling gratings optically coupled to the second and third arrays of linear waveguides, respectively, for out-coupling portions of the second and third light beam components, respectively, such that the portions of the second and third light beam components form arrays of optical power density peaks due to Talbot effect at the Talbot plane. The lightguide may further include a color-selective reflector in an optical path between the first, second, and third arrays of out-coupling gratings and the Talbot plane. The color-selective reflector may be configured to provide different optical path lengths for the first, second, and third light beam components to the Talbot plane.

Figure 1B:
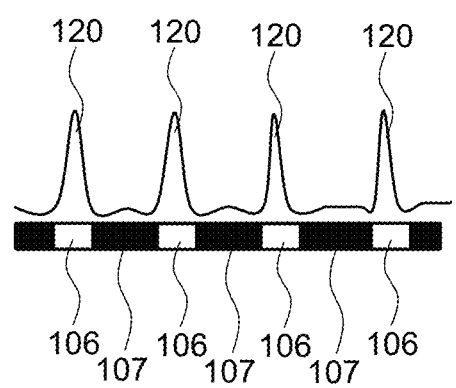
FIG. 1B is a magnified cross-sectional view of a pixel array of the display device of FIG. 1A superimposed with peaky Talbot optical power density distribution of the illuminating light at the pixel array.

Referring now to FIGS. 1A and 1B, a display device 100 (FIG. 1A) includes a display panel 102 and an illuminator 104 for illuminating the display panel 102. The display panel 102 includes an array of pixels 106 supported by a substrate 108. By way of a non-limiting example, the display panel 102 may be a liquid crystal (LC) panel including a thin layer of LC fluid between a pair of substrates, one of the substrates carrying an array of electrodes defining transmissive LC pixels. The illuminator 104 includes a light source 110 that provides a light beam 112, and a lightguide 114 coupled to the light source 110. The lightguide 114 receives and propagates the light beam 112 along the substrate 108, and may spread the beam along and across the lightguide 114, i.e. it may spread the beam in XY plane.

The lightguide 114 includes an array of out-coupling gratings 116 running parallel to the array of pixels 106. In operation, the out-coupling gratings 116 out-couple portions 118 of the light beam 112 from the lightguide 114 such that the out-coupled light beam portions 118 propagate through the substrate 108 and produce an array of optical power density peaks 120 (FIG. 1B) at the array of pixels 106 due to Talbot effect. Positions of the optical power density peaks 120 are coordinated with positions of the pixels 106, such that most of the illuminating light propagates through the pixels 106 and does not get blocked by opaque inter-pixel areas 107, improving the overall light throughput and, consequently, wall plug efficiency of the display device 100. One peak 120 may be provided per one pixel 106 as shown. In some embodiments, a distance between the peaks 120 may be equal to M times p, where p is a pitch of the array of pixels, and M is an integer ≥1. For example, in embodiments where Talbot pattern is produced at several wavelengths of the illuminating light, one peak 120 at a wavelength of a particular color channel may be provided per color sub-pixel of the pixel array, several sub-pixels forming one RGB pixel. Such structures will be considered further below.

The light beam portions 118 propagate towards an ocular lens 122 that collimates individual light beam portions 118 and redirects them towards an eyebox 124 of the display device 100. The function of the ocular lens 122 is to form an image in angular domain in the eyebox 124 from an image in linear domain displayed by the display panel 102.

Figure 2:
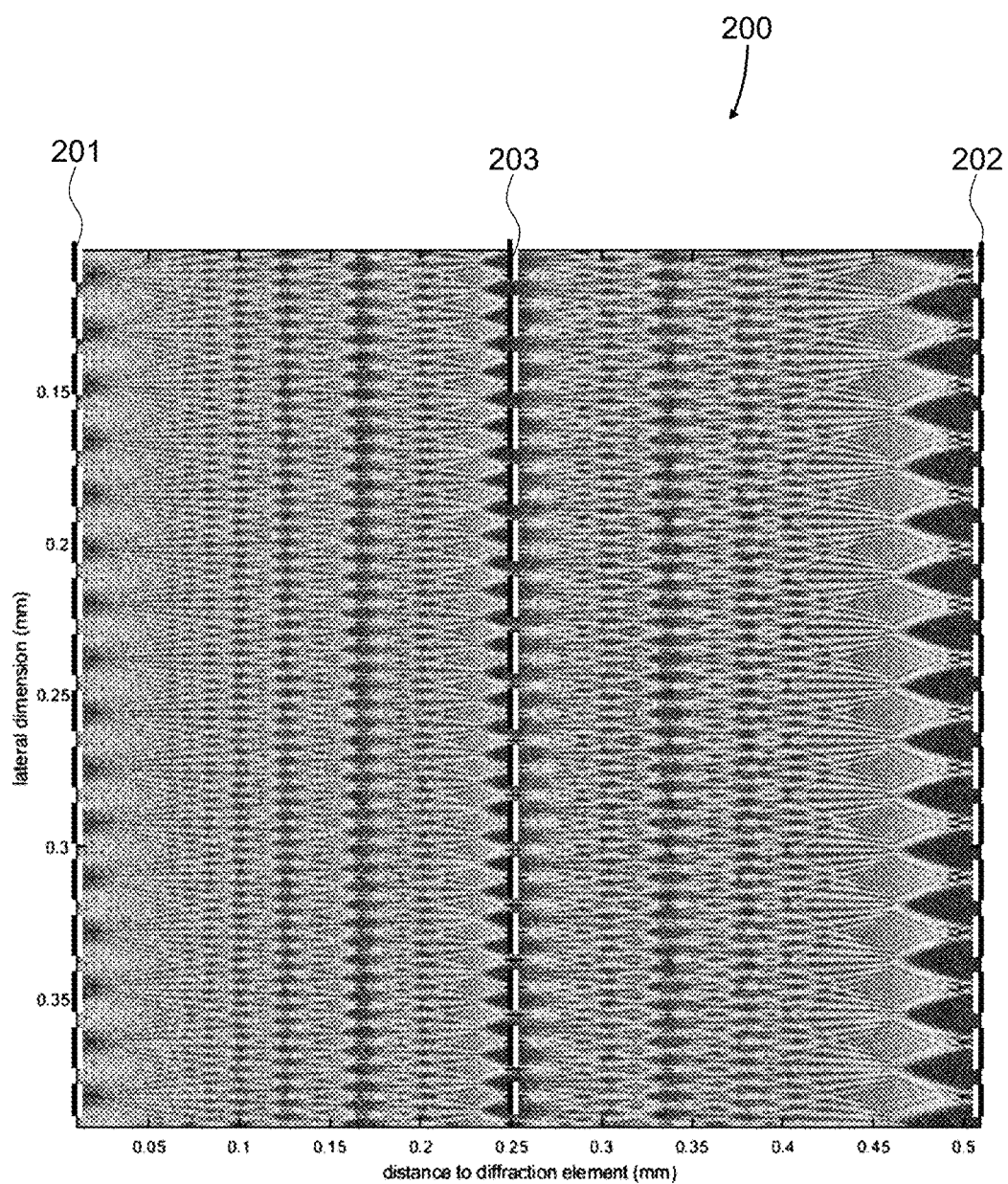
FIG. 2 is a computed map of an optical power density distribution across a display panel substrate of the display device of FIG. 1A.

Referring to FIG. 2, a Talbot fringe pattern 200 in the substrate 108 (FIG. 1A) of the display panel 102 is illustrated as an optical power density map. The Talbot fringe pattern 200 originates at a first plane 201 disposed parallel to the XY plane in FIG. 1A. The out-coupling gratings 116 are disposed in the first plane 201. Light propagates from left to right in FIG. 2, forming arrays of optical power density peaks at various distances from the first plane 201. The optical power density distribution at the first plane 201 is repeated at a second plane 202 separated from the first plane 201 by a Talbot pattern period, which is equal to 0.5 mm in this example. The array of pixels 106 may be located at the second plane 202. For embodiments where the array of out-coupling gratings 116 is disposed at a surface of the illuminator joining the substrate 108 as shown in FIG. 1A, the Talbot pattern period may be simply equal to a thickness of the substrate. More generally, a distance D between a plane of the out-coupling gratings and a plane of the pixels may include only a fraction of the Talbot pattern, or several such patterns, according to the following Eq. (1)

$$D = K(T_1)^2/(N\lambda), \qquad (1)$$

where K and N are integers ≥1, and where λ is a wavelength of the light beam in the substrate. In Eq. (1) above, K is the number of repetitions of the Talbot pattern, and N defines sub-planes of Talbot peaks with a higher pitch. For example, at a middle plane 203 separated form the first 201 and second 202 planes by 0.25 mm, the pitch is doubled.

Figure 3:
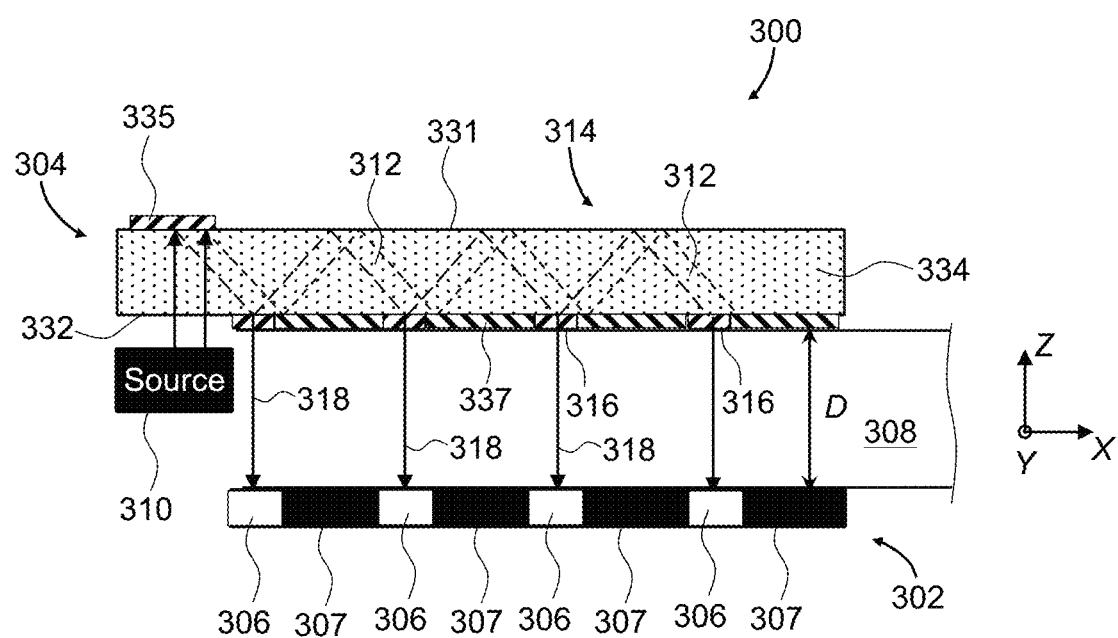
FIG. 3 is a side cross-sectional view of a light-guiding plate embodiment of an illuminator of the display device of FIG. 1A.

Referring to FIG. 3, a display device 300 is an embodiment of the display device 100 of FIG. 1. The display device 300 of FIG. 3 uses a light-guiding plate to expand the illuminating light along and across a display panel, i.e. in the XY plane. In the example shown, the display device 300 includes a display panel 302 coupled to an illuminator 304. The display panel 302 includes an array of pixels 306 separated by inter-pixel gaps or black grid 307 and supported by a transparent substrate 308. The display panel 302 may be e.g. an LC panel including a thin layer of LC fluid between a pair of substrates, an electrode pattern on one of the substrates defining transmissive pixels in the LC fluid layer. The illuminator 304 includes a light source 310 that provides a light beam 312, and a lightguide 314 coupled to the light source 310 by an in-coupling grating 335. The lightguide 314 receives and propagates the light beam 312 along the substrate 308, spreading the light beam 312 along and across the lightguide 314, i.e. in X- and Y-directions.

The lightguide 314 includes a transparent plano-parallel plate 334 having opposed parallel surfaces 331 and 332. In operation, the plate 334 receives the light beam 312 from the light source 310 and propagates the light beam 312 within by a series of total internal reflections, or TIRs, from the opposed parallel surfaces 331 and 332, as illustrated in FIG. 3. An array of out-coupling gratings 316, e.g. volume hologram gratings including, without limitation, polarization volume hologram (PVH) gratings, out-couples portions 318 of the light beam 312 from the plate 334. The light beam portions 318 propagate through the substrate 308, forming an array of optical power density peaks at the array of pixels 306 of the display panel 302 due to Talbot effect, similarly to what has been explained above with reference to FIGS. 1A, 1B, and FIG. 2. The lightguide 314 may further include redirecting gratings 337 for redirecting portions 318 of the light beam 312 for spreading the light beam 312 within the plate 334 in X- and Y-directions.

Figure 4:
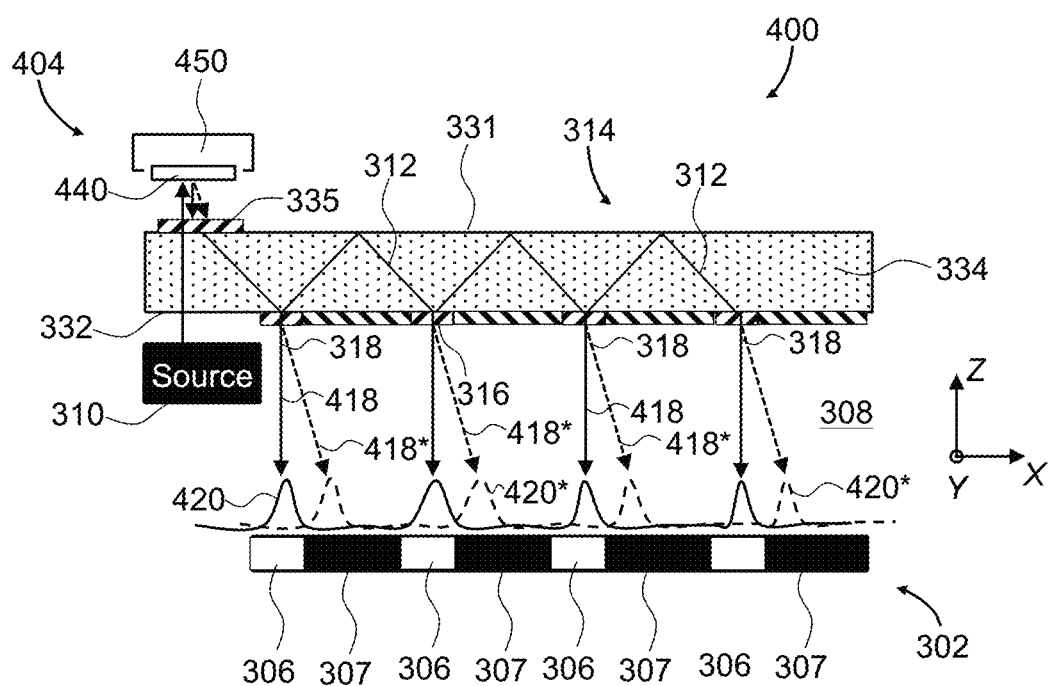
FIG. 4 is a side cross-sectional view of an embodiment of the illuminator of FIG. 3 using a tiltable microelectromechanical (MEMS) reflector for lateral adjustment of peak positions of the Talbot optical power density distribution on a pixel array.

Turning to FIG. 4, a display device 400 is an embodiment of the display device 100 of FIG. 1. The display device 400 is similar to the display device 300 of FIG. 3 in that it also uses a light-guiding plate to expand the illuminating light along and across a display panel. In the example shown, the display device 400 includes the display panel 302 coupled to an illuminator 404. The illuminator 404 uses the light source 310 to provide the light beam 312, which is in-coupled by the in-coupling grating 335 into the plate 334 propagating the light beam 312 by a series of TIRs from the opposed surfaces 331 and 332 of the plate 334. The out-coupling gratings 316 out-couple the portions 318 of the light beam 312 to propagate through the substrate 308. The light beam portions 318 form a Talbot pattern of optical power density at the array of pixels 306 of the display panel 302. The Talbot pattern has a plurality of peaks 420. The redirecting gratings 337 facilitate spreading the light beam 312 along and across the plate 334.

What makes the display device 400 different from the display device 300 of FIG. 3 is that the illuminator 404 of FIG. 4 includes a tiltable reflector 440 in an optical path between the light source 310 and the plate 334. The tiltable reflector 440, e.g. a microelectromechanical system (MEMS) reflector, is configured to couple the light beam 312 into the plate 334 by redirecting the light beam 312 to the in-coupling grating 335 at an angle variable, or adjustable, by tilting the tiltable reflector 440. As the in-coupling angle of the light beam 312 varies, so is the out-coupling angle of the light beam portions 318. This is illustrated in FIG. 4 by solid arrows 418 representing a nominal out-coupling angle of the light beam portions 318, and dashed arrows 418* representing the light beam portions 318 out-coupled at a different angle defined by the current tilting angle of the tiltable reflector 440. The adjustable out-coupling angle of the light beam portions 318 makes positions of peaks 420 of the optical power density distribution at the plane of the array of pixels 306 adjustable relative to the pixels 306. For example, when the light beam portions 318 exit at the tilted angle as indicated by the arrows 418*, the peaks 420 shift to positions indicated at 420*.

The adjustability of positions of the peaks 420 can be used to precisely center the peaks 420 on the pixels 306. This may be done e.g. during calibration of the manufactured display unit to increase the portion of light propagated through the display panel 302, thereby improving the wall plug efficiency of the display unit. The display device 400 may further include a controller 450 operably coupled to the tiltable reflector 440. The controller 450 may provide a control signal to tilt the tiltable reflector 440, which causes the optical power density distribution at the array of pixels 306 to shift as required.

When the controller 450 shifts the peaks 420 of the optical power density distribution by an entire pitch of the pixels 306, the optical throughput of the light beam components 318 through the display panel 302 reaches a maximum value again. It is to be noted that at an optical power density distribution shifted by an integer multiple of the pitch of the array of pixels 306, the overall direction of the light propagated through the display panel 302 changes by small discrete amounts. Therefore, by tilting the tiltable reflector 440, one may steer an output pupil of the display device to a required location, by performing a plurality of non-zero steps. The required beam location may correspond, for example, to a location of a user's eye pupil determined by an eye tracking system of the display device. The pupil steering enables one to further improve the overall light utilization and wall plug efficiency of the display unit.

In some embodiments, the light source 310 may be configured to provide light beam components for individual color channels such as red (R), green (G), and blue (B) color channels. The light source 310 may provide first, second, and third beam components at first (e.g. red), second (e.g. green), and third (e.g. blue) wavelengths respectively. The first, second, and third beam components may be combined into a single light beam by using a wavelength division multiplexor (WDM), which may include a set of dichroic mirrors, for example. In embodiments where the light beam includes beam components at different wavelengths, the lightguide may include first, second and third arrays of wavelength-selective out-coupling gratings optically coupled to the light-guiding plate. The first, second, and third arrays of out-coupling gratings may extend or run parallel to the array of pixels for wavelength-selective out-coupling of portions of the first, second, and third light beam components respectively, for illuminating the array of pixels through the substrate. Since the distance D between a plane of the out-coupling gratings and a plane of the pixels defined by Eq. (1) above includes a wavelength of the light beam, the first, second, and third arrays of out-coupling gratings would need to be disposed at different distances from the plane of the array of pixels, i.e. at different depths in the light-guiding plate, to ensure that sharp Talbot peaks are formed at the same plane for different color channels.

Figure 5:
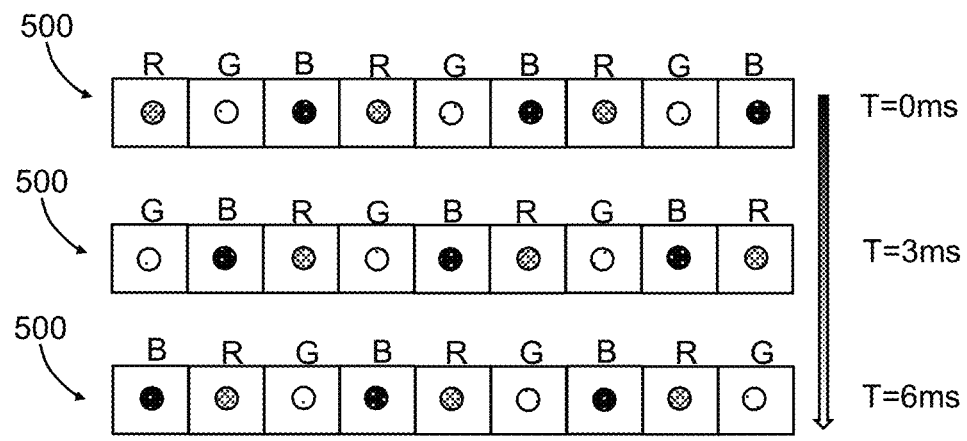
FIG. 5 is a schematic frontal view of a pixel array illuminated with the illuminator of FIG. 4, showing focal spots of different colors shifted by tilting the MEMS reflector.

The first, second, and third arrays of out-coupling gratings may be offset from one another, so as to form arrays of laterally offset Talbot peaks for illuminating sub-pixels of different color channels. For example, referring to FIG. 5, an array of pixels 500 may be illuminated at a moment of time T=0ms with a first array of red Talbot peaks ("R", grey-shaded circles), a second array of green Talbot peaks ("G", white circles), and a third array of blue Talbot peaks ("B", black circles), as illustrated with the top row of pixels. At T=0ms, the pixels 500 of the array are assigned roles of R, G, and B sub-pixels, in going from left to right. In other words, the transmission values of these pixels is set according to the relative strength of R, G, and B color channels for the particular RGB pixels. At T=3 ms, the roles shift by one pixel, i.e. the pixels 500 of the array are assigned roles of G, B, and R sub-pixels, in going from left to right. At T=6 ms, the roles shift by one more pixel, i.e. the pixels 500 of the array are assigned roles of B, R, and G sub-pixels, in going from left to right. Further shifts may be possible. This enables one to provide a horizontal spatial resolution of one sub-pixel and not three sub-pixels forming an RGB pixel, improving the overall spatial resolution of RGB pixels by a factor of three. The same technique can of course be applied to vertically shifted pixels. Also, it is to be noted that the time interval of 3 ms in FIG. 5 is meant only as an example; other time intervals are of course possible. Shifting illuminating beam components by an integer multiple of a pixel pitch allows a very flexible assignment of R, G, and B sub-pixels to individual pixels of the array of pixels 500, enabling one to improve the overall achievable throughput and spatial resolution.

Figure 6:
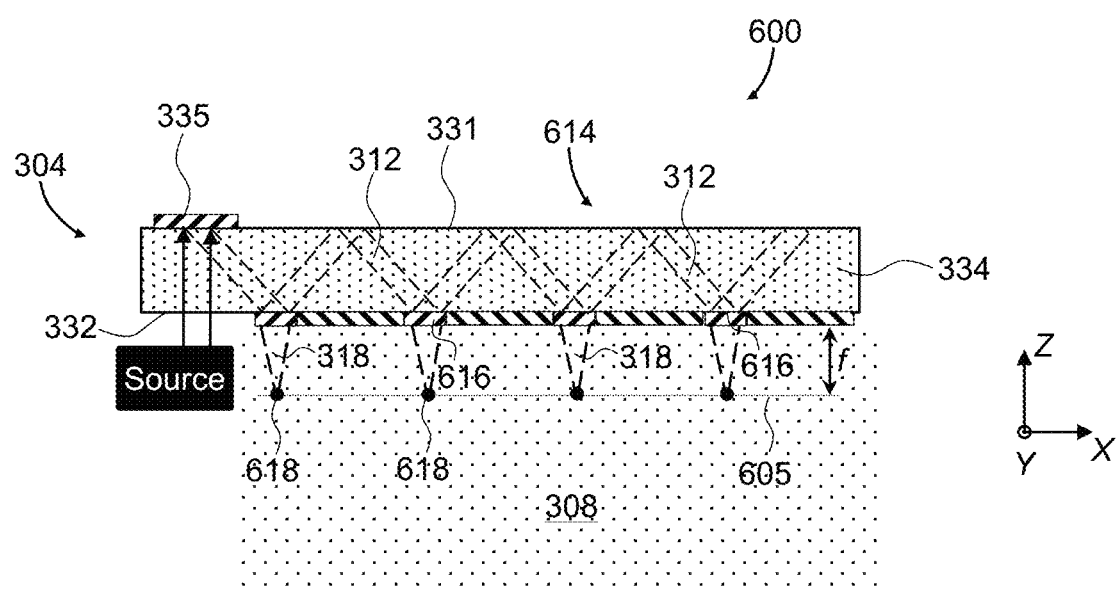
FIG. 6 is a side cross-sectional view of an embodiment of the illuminator of FIG. 3 with focusing out-coupling gratings.

Referring now to FIG. 6, a display device 600 an embodiment of the display device 100 of FIG. 1. The display device 600 is also similar to the display device 300 of FIG. 3 in that it uses the light-guiding plate 334 to expand the illuminating light over a display panel. Only a portion of the substrate 308 of the display panel is shown in FIG. 6 for simplicity.

The display device 600 includes the light source 310 to provide the light beam 312, which is in-coupled by the in-coupling grating 335 into the plate 334 of a lightguide 614 propagating the light beam 312 by a series of TIRs from the opposed surfaces 331 and 332 of the plate 334. Out-coupling gratings 616 of the lightguide 614 are configured to focus the out-coupled portions 318 of the light beam 312 at focal points 618 disposed on a same focal plane 605 disposed at a non-zero distance from the plate 334. The distance to the focal plane 605 is equal to a focal length f of the gratings 616. To provide the focusing (narrowing the beam) or defocusing (widening the beam) capability, the out-coupling gratings 616 may include volume gratings, e.g. polarization volume gratings (PVH), with curved fringes to provide the focusing function. Focusing the light beam portions 318 at the focal plane 605 away from the lightguide 614 enables one to increase, by the focal length f, the thickness of the substrate of a display panel illuminated with the lightguide 614 with Talbot optical power density distribution.

Figure 7:
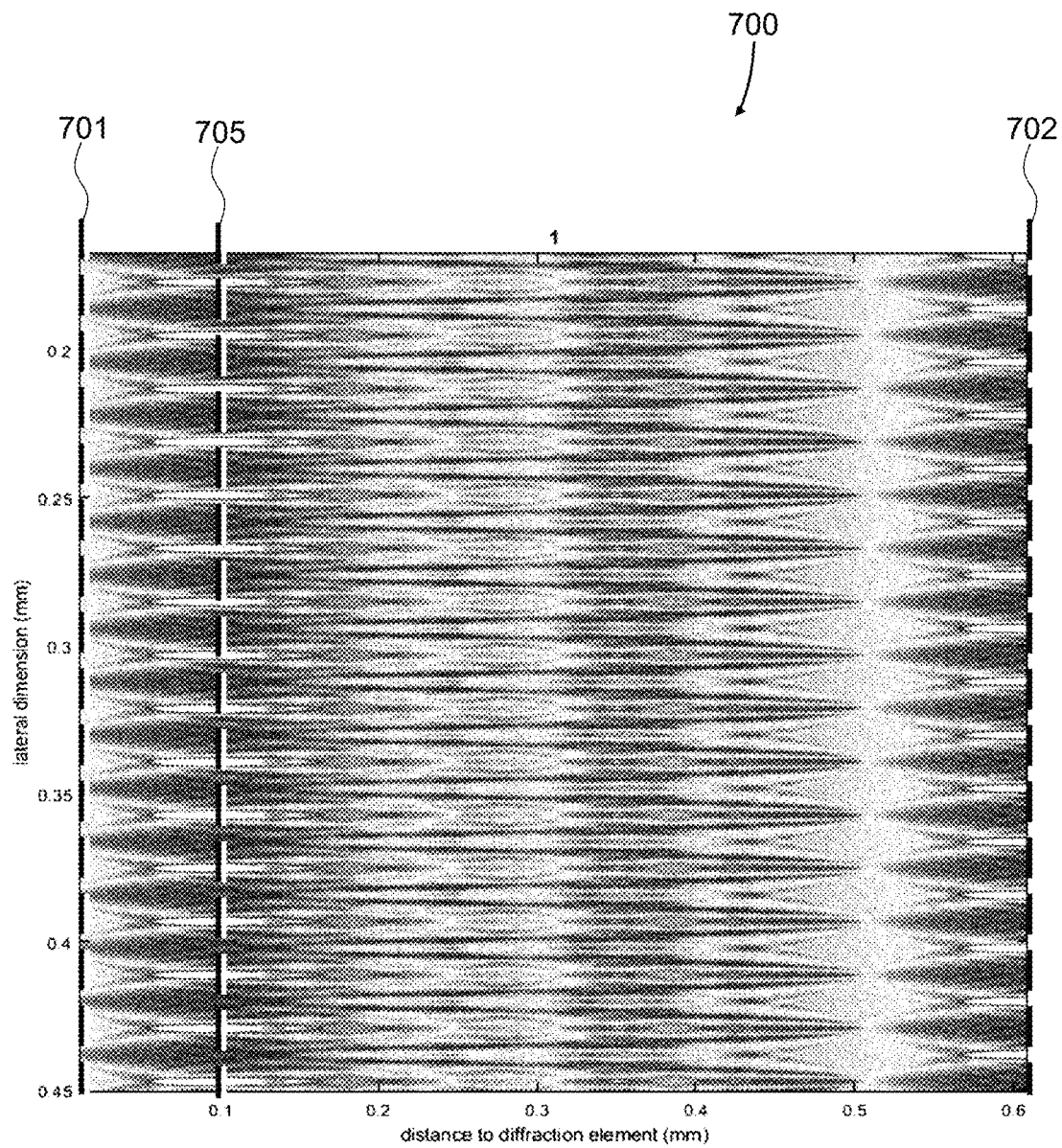
FIG. 7 is a computed map of an optical power density distribution across a display panel substrate illuminated with the illuminator of FIG. 6.
Figure 8:
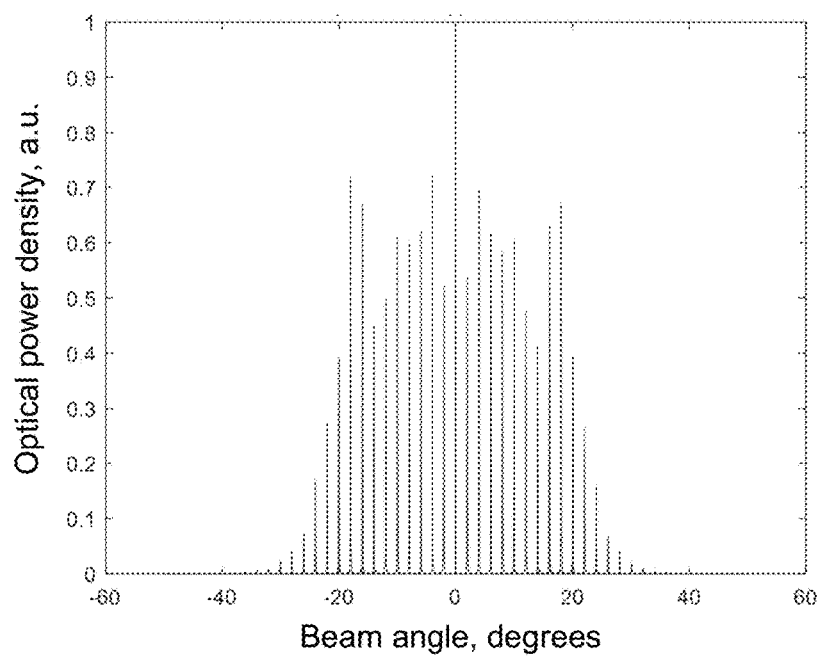
FIG. 8 is an example angular distribution of illumination energy of the illuminator of FIG. 6 with 18 micrometers wide focusing gratings having 20 micrometers focal length.

The latter point is illustrated in FIG. 7, which shows a map of optical power density in a substrate of a display panel illuminated with the lightguide 614 of FIG. 6, e.g. in the display panel substrate 308. The out-coupled beam portions 318 (FIG. 6) are focused at a focal plane 705 (FIG. 7) corresponding to the focal plane 605 in FIG. 6, which is 0.1 mm away from a first plane 701 of the out-coupling gratings 616, within the substrate 308 of the display panel 600. The area of the Talbot fringe pattern 700 of FIG. 7 between the first plane 701 and a second plane 702 where the pixel array is located is similar to the Talbot fringe pattern 200 of FIG. 2. Focusing forward i.e. downstream in the optical path allows one to use a thicker substrate of a display panel, while reducing the spot size and increasing the divergence of the light beams at the second focal plane. An additional bonus is that the increased divergence of the output light beam upstream of the ocular lens increases the exit pupil size of the display at the eyebox, e.g. the eyebox 124 of the display device downstream the ocular lens 122 (FIG. 1). The exit pupil size may be increased to be larger than a typical eye pupil size, i.e. it may overfill the eye pupil. A light cone of at least +/−15 degrees may be required to overfill the eye pupil, depending on focal length of the ocular lens of the display device. As an illustration, FIG. 8 shows an angular distribution of optical power density in arbitrary units vs. the beam angle of the light beam exiting a pixel of the pixel array with the light beam portions out-coupled and focused by an array of 18 micrometers wide volume hologram gratings with 20 micrometers focal length.

Figure 9:
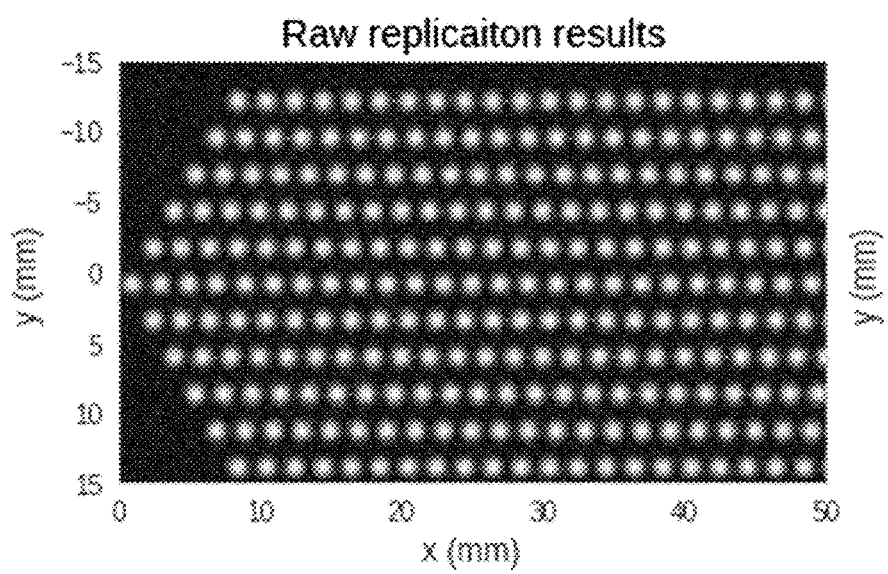
FIG. 9 is a display panel illumination map example showing an insufficient pupil replication density.

A pupil-replicating lightguide used as an illuminator for a display panel needs to provide a homogeneous illumination of the display panel. Referring to FIG. 9, a 30×50 mm miniature display panel is illuminated with a plano-parallel light guiding plate equipped with a 2D array of out-coupling gratings. Although the pitch of the gratings is very tight and may be as tight as the pitch of the display pixels, the illumination pattern remains highly non-uniform. The non-uniformity is represented by a hexagonal array of round light spots seen in FIG. 9, and is caused not by the insufficient pitch of the out-coupling gratings but by too large a step between TIRs of the illuminating light beam in the light-guiding plate.

Figure 10:
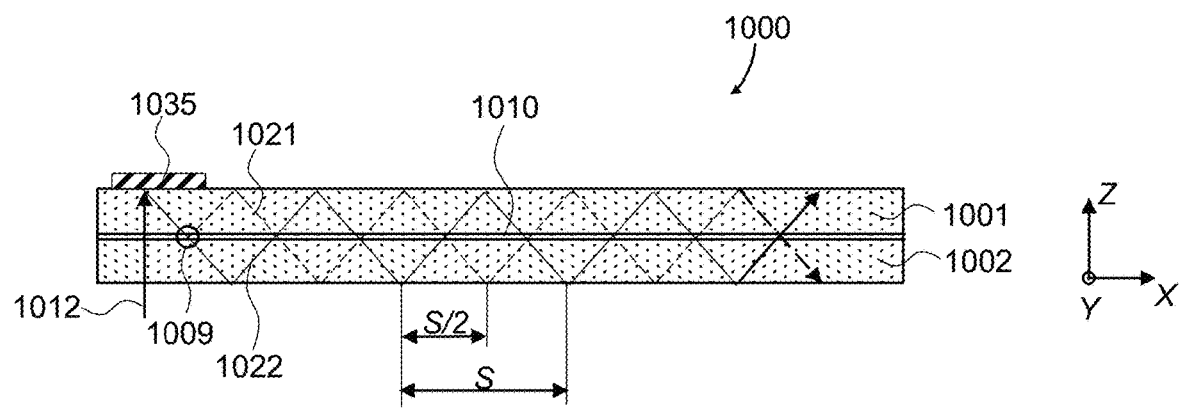
FIG. 10 is an embodiment of a light-guiding plate with a buried partial reflector for a higher pupil replication density.

The step may be reduced by using a thinner light-guiding plate and/or by providing several such plates optically coupled into a stack by common partially reflective surface(s) interleaved between the plates. Referring for an example to FIG. 10, a light-guiding plate 1000 includes a buried partial reflector 1010, e.g. a 50% reflector, at a middle thickness of the light-guiding plate 1000. In practical terms, the light-guiding plate 1000 may be made of a pair of thinner plates 1001 and 1002 optically coupled together by the partial reflector 1010 parallel to the XY plane along one of their respective parallel light-guiding surfaces parallel to the XY plane.

In operation, a light beam 1012 is in-coupled by an in-coupling grating 1035 into the first plate 1001, and is split at a point 1009 into two beams, a first beam 1021 and a second beam 1022, which partially propagate in the respective plates 1001 and 1002, and partially cross over into the other plates as they propagate further. The net result of such beam propagation is that a step S that each beam 1021 and 1022 makes along the X-direction halves, which doubles the density of the illuminating light spots, eventually merging them into a continuous illumination pattern.

Figures 11A, 11B:
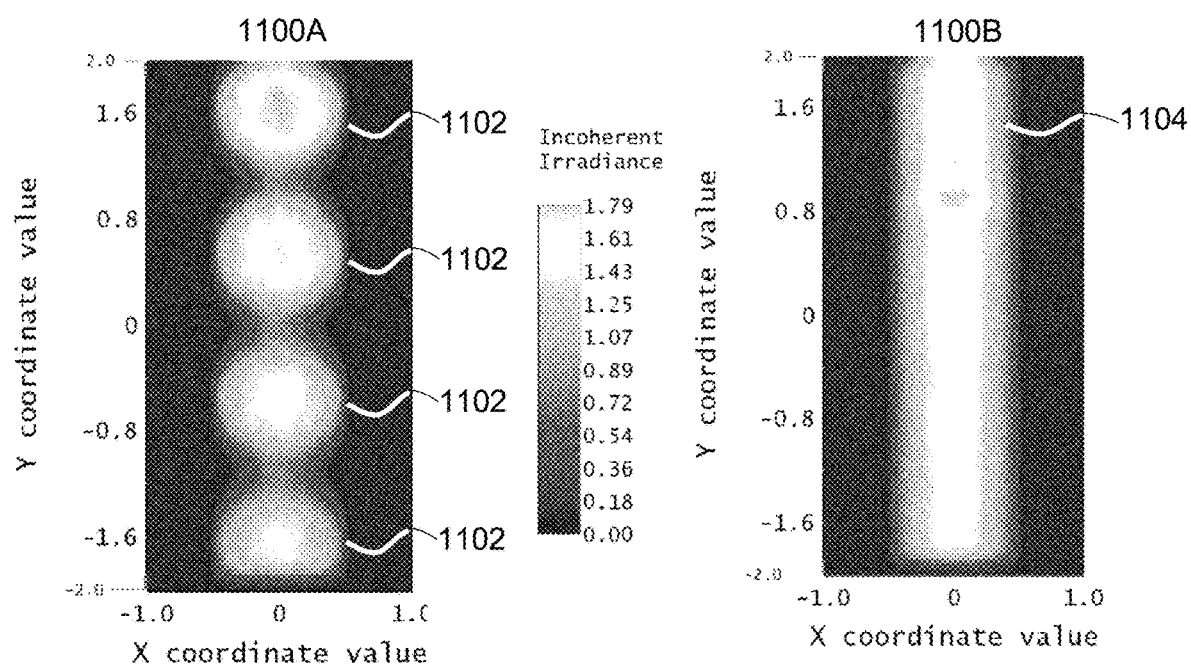
FIG. 11A is a reference illumination map a light-guiding plate without the buried reflector.
FIG. 11B is an illumination map a light-guiding plate with the buried reflector.

The latter point is illustrated in FIGS. 11A and 11B. Referring first to FIG. 11A, a reference illumination pattern 1100A includes a series of light spots 1102, each spot 1102 corresponding to an area where the light beam reflects from one of the parallel surfaces of the plate. The excessive plate thickness in comparison with the light beam diameter causes the separate illumination spots 1102 to appear. Turning to FIG. 11B, an illumination pattern 1100B corresponds to the case of a light-guiding plate having a buried at the middle thickness 50% reflector. The illumination pattern 1100B includes a continuous bar 1104, which consists of densely overlapping light spots. This example shows the beam expansion on one direction only. Two-directional beam expansion shows a similar trend, with a continuous illumination of the entire display panel. The illuminating light beam should have a sufficiently broad spectrum and, accordingly, a sufficiently small coherence length to wash out any optical interference between neighboring light spots. By way of a non-limiting example, at a spectral width of a superluminescent light-emitting diode (SLED) or a pulsed laser diode of about 5 nm, the coherence length is about 60 micrometers. For as long as a lightguide plate thickness is much larger than the coherence length, the interference-caused speckle pattern is washed out.

Figure 12:
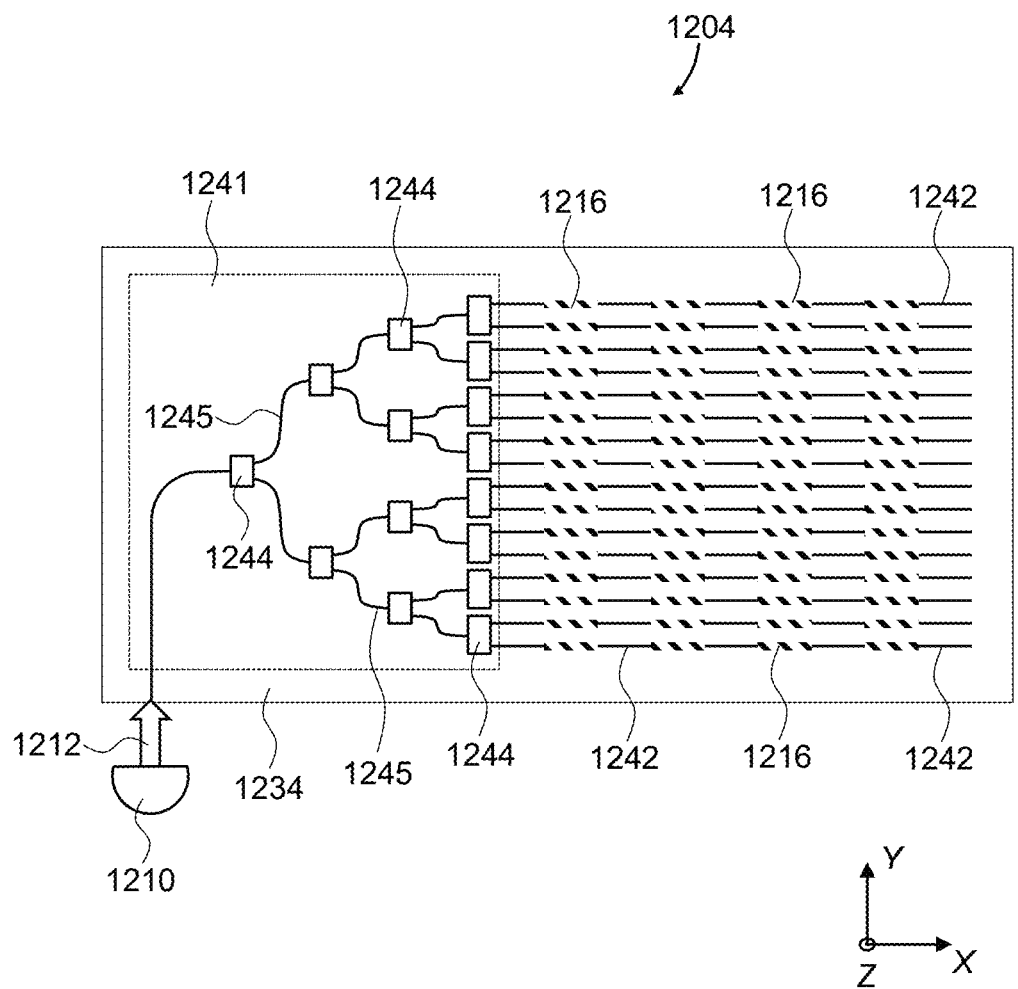
FIG. 12 is a schematic plan view of a photonic integrated circuit (PIC) embodiment of a Talbot illuminator of this disclosure.

Referring now to FIG. 12, an illuminator 1204 includes a light source 1210 for providing a light beam 1212 to a lightguide 1234. The lightguide 1234 includes an optical dispatching circuit 1241 coupled to the light source 1210. The optical dispatching circuit 1241 is based on linear waveguides and is configured to receive and split the light beam 1212 into a plurality of sub-beams propagating in individual linear waveguides. Herein, the term "linear waveguide" denotes a waveguide that bounds the light propagation in two dimensions, like a light wire. A linear waveguide may be straight, curved, etc.; in other words, the term "linear" does not mean a straight waveguide section. One example of a linear waveguide is a ridge-type waveguide.

To split the light beam 1212 into a plurality of sub-beams, the optical dispatching circuit 1241 may include a binary tree of 1×2 waveguide splitters 1244 coupled to one another by linear waveguides 1245. Other configurations of the optical dispatching circuit 1241 are possible, e.g. they may be based on a tree of Mach-Zehnder interferometers, and may include separate waveguide trees for light source components at different wavelengths, e.g. wavelengths of different color channels.

The lightguide 1234 further includes an array of linear waveguides 1242 coupled to the optical dispatching circuit 1241 for receiving the sub-beams from the optical dispatching circuit 1241. The linear waveguides 1242 run parallel to one another to propagate the sub-beams in them. The lightguide 1234 further includes an array of out-coupling gratings 1216 optically coupled to linear waveguides 1242 of the array of linear waveguides for out-coupling portions of the sub-beams propagating in the linear waveguides 1242. The out-coupling gratings 1216 are disposed parallel to the XY plane as shown, and perform a same or similar function as the out-coupling gratings 116 of the lightguide 114 of the illuminator 104 of FIG. 1A. Specifically, the out-coupling gratings 1216 out-couple the sub-beam portions from the respective linear waveguides 1242 to propagate through a substrate of a display panel and form arrays of optical power density peaks due to Talbot effect at a Talbot plane spaced apart from the array of out-coupling gratings 1216, as has been explained above with reference to FIGS. 1A, 1B, and FIG. 2.

FIGS. 13A to 13C illustrate one possible implementation of the lightguide 1234 of FIG. 12. Referring first to FIGS. 13A and 13B, a photonic integrated circuit (PIC) illuminator 1304 includes a substrate 1306 and an array of linear waveguides 1307 supported by the substrate 1306 and running along the array of pixels of a display panel. In the PIC illuminator 1304 shown in FIG. 13A, the linear waveguides 1307 include an array of "red waveguides" 1307R for conveying light at a red wavelength, an array of "green waveguides" 1307G for conveying light at a green wavelength, and an array of "blue waveguides" 1307B for conveying light at a blue wavelength. Light 1308 at different wavelengths may be generated by a multi-wavelength light source 1310 and distributed among different waveguides 1307R, 1307G, and 1307B by an optical dispatching circuit 1319, which is a part of the PIC. The function of the dispatching circuit 1319 is to expand the light along Y-direction and to reroute the light into the array of linear waveguides 1307. One row of pixels of the display panel may be disposed across all the linear waveguides 1307R, 1307G, and 1307B of red, green, and blue color channels respectively, the linear waveguides extending vertically in FIG. 13A. A row of pixels is outlined with dashed rectangle 1313 in FIG. 13A.

FIG. 13B is a magnified view of three color channel waveguides under a single pixel 1303 of the display panel. Each of the three color sub-pixels corresponds to one of a red (R), green (G), and blue (B) color channel of the image, respectively. More than three color sub-pixels may be provided, e.g. in a RGGB scheme. Light portions may be out-coupled, or redirected, from the ridge waveguides 1307R, 1307G, and 1307B by the respective gratings 1312R, 1312G, and 1312B shown in FIG. 13C forming corresponding arrays of gratings for each color channel. The gratings 1312R, 1312G, and 1312B may be chirped for focusing the out-coupled light beam in a direction along the waveguides, i.e. vertically in FIGS. 13A and 13B i.e. along X-axis. Additionally, the grating groove can be curved, to focus light in the horizontal direction, in FIGS. 13A and 13B i.e. along Y-axis. In the example of FIG. 13C, gratings 1312R, 1312G, and 1312B are formed in linear waveguides 1307R, 1307G, and 1307B respectively, although in some embodiments the arrays of gratings may be formed separately and optically coupled to the array of linear waveguides 1307.

For focusing the out-coupled light beams in horizontal direction in FIG. 13B, 1D microlenses 1318 may be provided as shown. Herein, the term "1D microlenses" denotes lenses that focus light predominantly in one dimension, e.g. cylindrical lenses. 2D lenses, i.e. lenses focusing light in two orthogonal planes, may be provided instead of 1D lenses. The array of microlenses 1318 disposed in an optical path between the gratings 1312R, 1312G, and 1312B and the pixels 1303R, 1303G, and 1303B may be used to at least partially focus of the light redirected by the gratings 1312R, 1312G, and 1312B for propagation through corresponding sub-pixels 1303R, 1303G, and 1303B. The configuration is shown in FIG. 13B for one white pixel 1303. The white pixel configuration may be repeated for each white pixel of the display panel.

Figure 14:
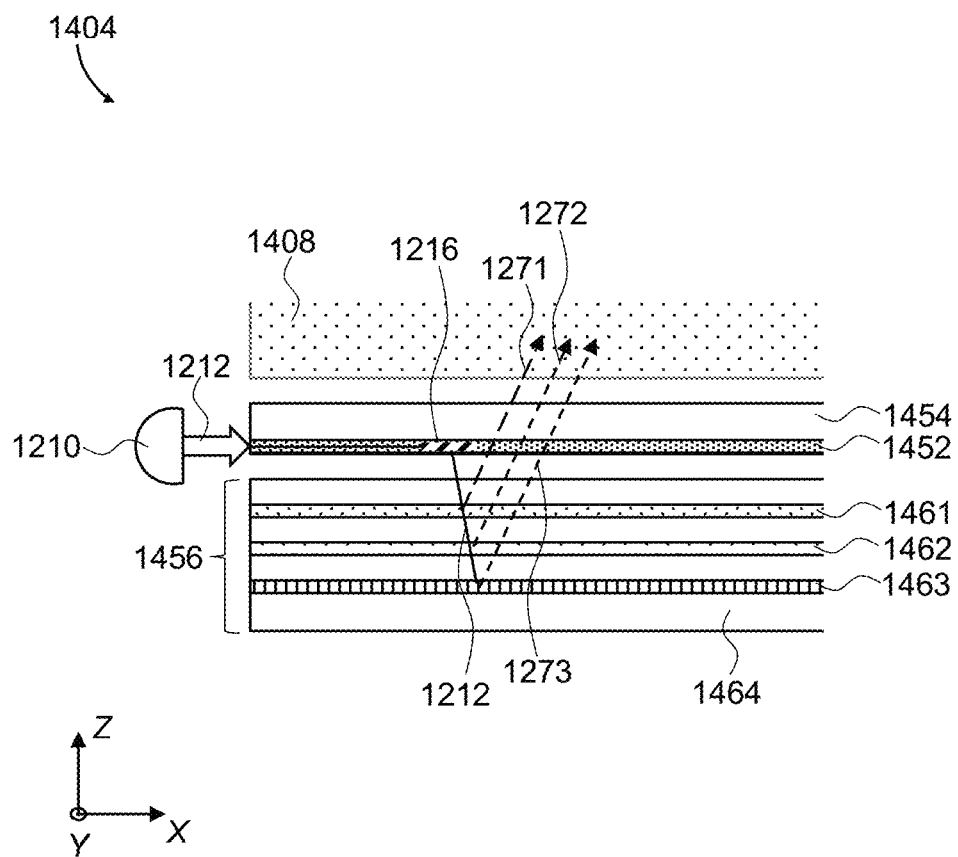
FIG. 14 is a cross-sectional exploded view of an embodiment of a multi-color PIC illuminator with a dichroic mirror.

Turning to FIG. 14, an illuminator 1404 includes the elements of the illuminator 1204 of FIG. 12. The waveguide structures of the optical dispatching circuit 1241, including the waveguide splitters and coupling linear waveguides and the array of straight linear waveguides 1242, are formed in a core layer 1452 supported by a substrate 1454. The illuminator 1404 further includes a color-selective reflector 1456 in an optical path of the light beam 1212 between the arrays of out-coupling gratings 1216 formed in the core layer 1452 on one hand, and a substrate 1408 of the display panel on the other. The color-selective reflector 1456 is configured to provide different optical path lengths for the light beam components at different wavelengths. To that end, the color-selective reflector 1456 may include first 1461, second 1462, and third 1463 reflectors supported by a reflector substrate 1464 at different depths (i.e. different Z-coordinates) within the reflector substrate 1464. The first 1461 and second 1462 reflectors may be dichroic reflectors. The first reflector 1461 reflects light at a first wavelength and transmits light at second and third wavelengths; the second reflector 1462 transmits light at the first and third wavelengths, and reflects the light at the second wavelength. The third reflector may be a 100% mirror reflecting light at all wavelengths, or may also be a dichroic mirror that only reflects light at the third wavelength, to reduce color channel crosstalk.

In operation, the light beam 1212 carries first 1271, second 1272, and third 1273 beam components for carrying light at first, second, and third wavelengths, respectively. For example, the first 1271, second 1272, and third 1273 beam components may be at red, green, and blue wavelengths respectively. The first beam component 1271 is reflected by the first reflector 1461, with the remaining beam components 1272 and 1273 being transmitted through. The second beam component 1272 is reflected by the second reflector 1462, with the third beam component 1273 being transmitted through. Finally, the third beam component 1273 is reflected by the third reflector 1463. As a result of the split propagation, different beam components will propagate different distances before they reach the substrate 1408 of the display panel. The different distances may be selected to compensate for the different distances to Talbot plane for light at different wavelengths, as defined by Eq. (1) above, causing the peaky Talbot patterns to overlap at the pixel plane of the display panel.

Figure 15:
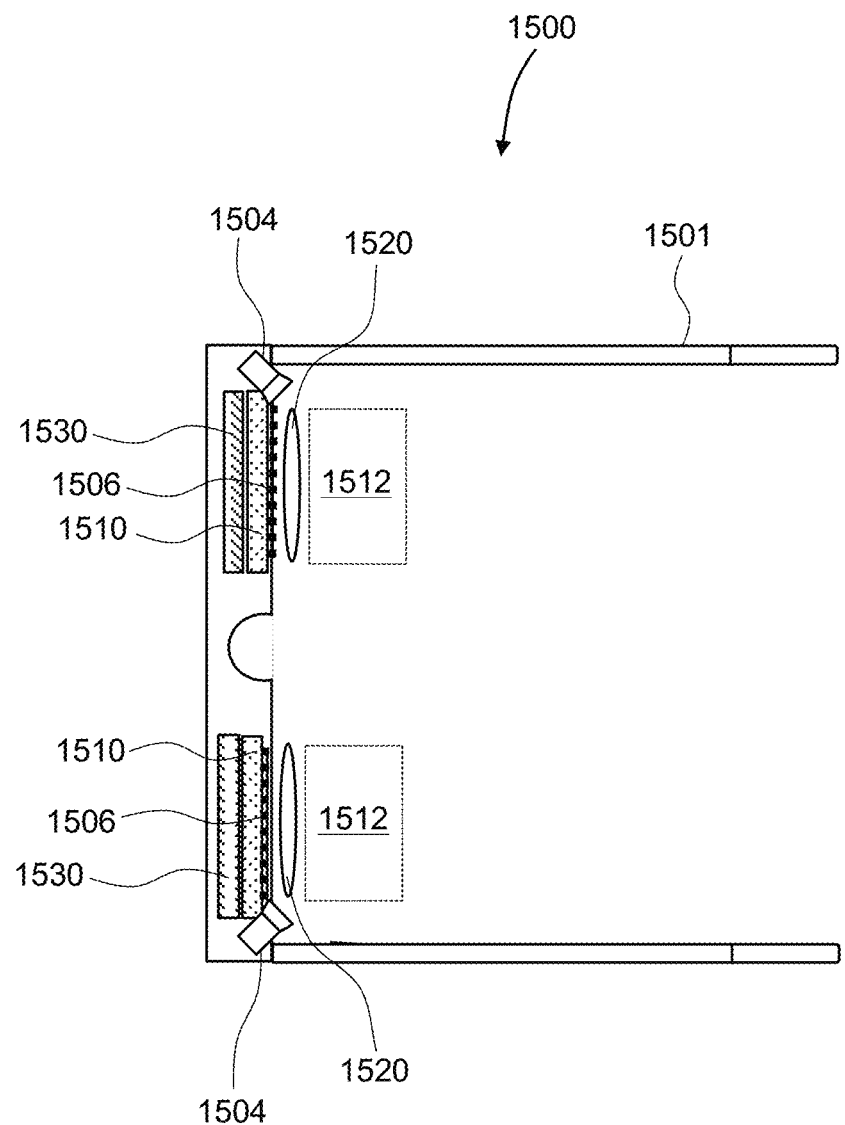
FIG. 15 is a plan schematic view of a near-eye display using a display device and/or an illuminator of this disclosure.

Turning to FIG. 15, a near-eye display 1500 includes a frame 1501 having a form factor of a pair of eyeglasses. The frame 1501 supports, for each eye: a display panel 1510 for providing an image in linear domain, an ocular lens 1520 for converting the image in linear domain into an image in angular domain for observation by an eye placed into an eyebox 1512, and a display panel illuminator 1530, including any illuminator of this disclosure. The display panel illuminator 1530 illuminates the pixel array of the display panel 1510 with a Talbot illumination pattern coordinated with the pixel array pattern as explained herein. A plurality of eyebox illuminators 1506 illuminate the eyebox 1512, and an eye-tracking camera 1504 takes live images of the user's eyes. The eye illuminators 1506 may be supported by the display panel 1510.

The purpose of the eye-tracking cameras 1504 is to determine position and/or orientation of both eyes of the user. Once the position and orientation of the user's eyes are known, the exit pupil of the back-illuminated displays may be adjusted to send the display light to the eye pupils, e.g. by relying on tiltable reflectors built into the display panel illuminator of FIG. 4. Dynamic exit pupil steering improves the overall light utilization efficiency of the near-eye display 1500. Another use of the eye tracking data is for calibration or image correction purposes. Furthermore, the imagery displayed by the near-eye display 1500 may be dynamically adjusted to account for the user's gaze, for a better fidelity of immersion of the user into the displayed augmented reality scenery, and/or to provide specific functions of interaction with the augmented reality.

The eyebox illuminators 1506 illuminate the eyes at the corresponding eyeboxes 1512, for the eye-tracking cameras to obtain the images of the eyes, as well as to provide reference reflections i.e. glints. The glints may function as reference points in the captured eye images, facilitating the eye gazing direction determination by determining position of the eye pupil images relative to the glints images. To avoid distracting the user with illuminating light, the latter may be made invisible to the user. For example, infrared light may be used.

Figure 16:
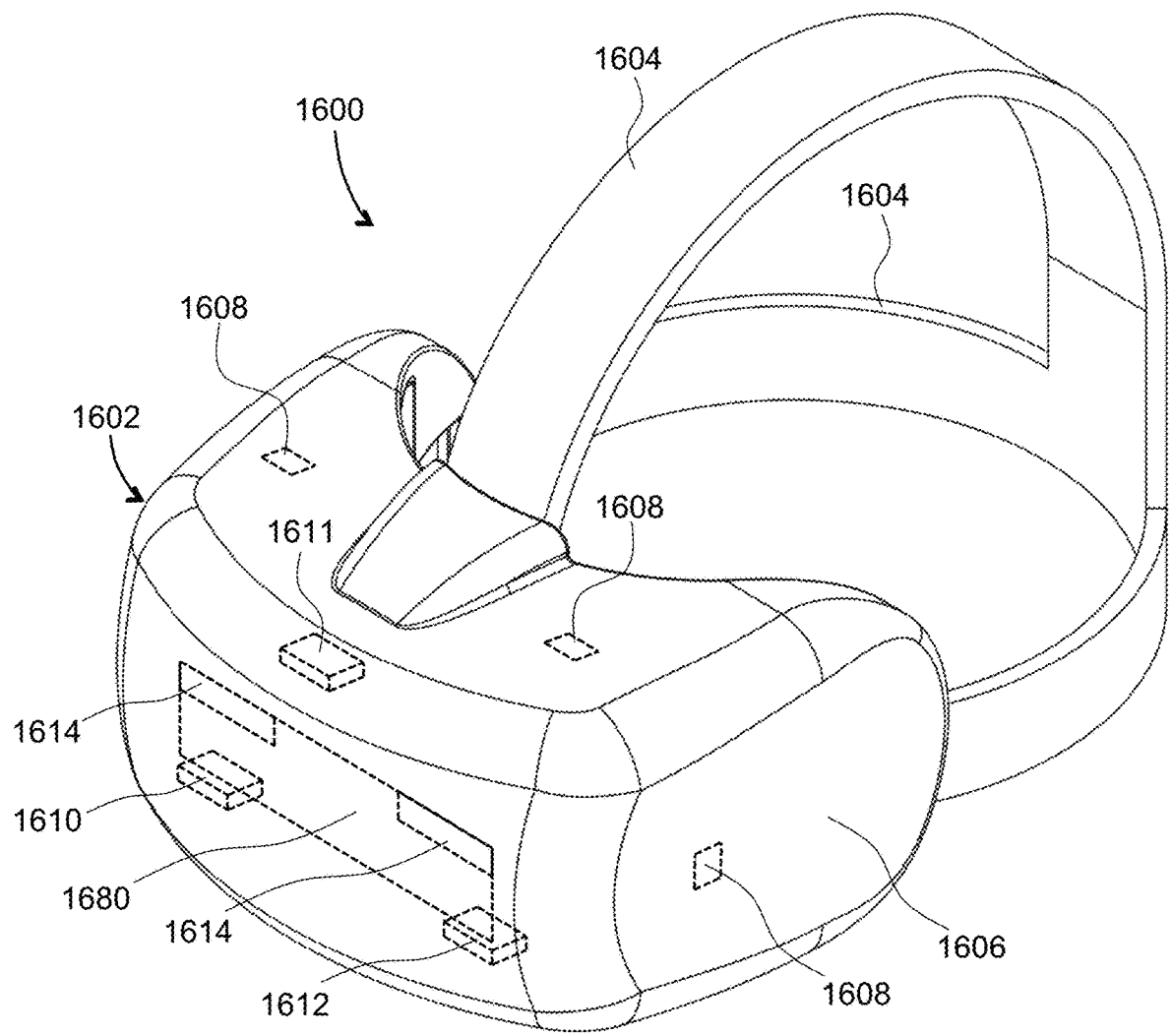
FIG. 16 is a view of a head-mounted display of this disclosure using a display device and/or an illuminator of this disclosure.

Turning to FIG. 16, an HMD 1600 is another example of a wearable display system that may use illuminators and/or display devices of this disclosure. The function of the HMD 1600 is to augment views of a physical, real-world environment with computer-generated imagery, and/or to generate the entirely virtual 3D imagery. The HMD 1600 may include a front body 1602 and a band 1604. The front body 1602 is configured for placement in front of eyes of a user in a reliable and comfortable manner, and the band 1604 may be stretched to secure the front body 1602 on the user's head. A display system 1680 may be disposed in the front body 1602 for presenting AR/VR imagery to the user. Sides 1606 of the front body 1602 may be opaque or transparent.

In some embodiments, the front body 1602 includes locators 1608 and an inertial measurement unit (IMU) 1610 for tracking acceleration of the HMD 1600, and position sensors 1612 for tracking position of the HMD 1600. The IMU 1610 is an electronic device that generates data indicating a position of the HMD 1600 based on measurement signals received from one or more of position sensors 1612, which generate one or more measurement signals in response to motion of the HMD 1600. Examples of position sensors 1612 include: one or more accelerometers, one or more gyroscopes, one or more magnetometers, another suitable type of sensor that detects motion, a type of sensor used for error correction of the IMU 1610, or some combination thereof. The position sensors 1612 may be located external to the IMU 1610, internal to the IMU 1610, or some combination thereof.

The locators 1608 are traced by an external imaging device of a virtual reality system, such that the virtual reality system can track the location and orientation of the entire HMD 1600. Information generated by the IMU 1610 and the position sensors 1612 may be compared with the position and orientation obtained by tracking the locators 1608, for improved tracking accuracy of position and orientation of the HMD 1600. Accurate position and orientation is important for presenting appropriate virtual scenery to the user as the latter moves and turns in 3D space.

The HMD 1600 may further include a depth camera assembly (DCA) 1611, which captures data describing depth information of a local area surrounding some or all of the HMD 1600. To that end, the DCA 1611 may include a laser radar (LIDAR), or a similar device. The depth information may be compared with the information from the IMU 1610, for better accuracy of determination of position and orientation of the HMD 1600 in 3D space.

The HMD 1600 may further include an eye tracking system 1614 for determining orientation and position of user's eyes in real time. The obtained position and orientation of the eyes also allows the HMD 1600 to provide the display exit pupil steering, and/or to determine the gaze direction of the user and to adjust the image generated by the display system 1680 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1602.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A display device comprising:
   a display panel comprising an array of pixels on a substrate, and an illuminator for illuminating the display panel, the illuminator comprising a light source for providing a light beam, and a lightguide coupled to the light source for receiving and propagating the light beam along the substrate, the lightguide comprising a first array of out-coupling gratings;
   wherein the first array runs parallel to the array of pixels for out-coupling portions of the light beam from the lightguide such that the out-coupled light beam portions propagate through the substrate and produce an array of optical power density peaks at the array of pixels due to Talbot effect, wherein a period of the array of optical power density peaks is M times p, where p is a pitch of the array of pixels, and M is an integer $\geq 1$.

2. The display device of claim 1, wherein a first pitch $T_1$ of the first array of out-coupling gratings is M times p, and wherein a distance D from a plane comprising the first array of out-coupling gratings to a plane comprising the array of pixels is $D = K (T_1)^2/(N \lambda)$, where K and N are integers $\geq 1$ and $\lambda$ is a wavelength of the light beam in the substrate.

3. The display device of claim 2, wherein the first array of out-coupling gratings is disposed at a surface of the illuminator facing the substrate, wherein the distance D is equal to a thickness of the substrate.

4. The display device of claim 1, wherein gratings of the first array of out-coupling gratings are configured to focus or defocus the out-coupled portions of the light beam.

5. The display device of claim 1, wherein the lightguide comprises a first plate for propagating at least a portion of the light beam therein by a series of total internal reflections between opposed parallel surfaces of the first plate.

6. The display device of claim 5, wherein the lightguide further comprises an array of redirecting gratings for redirecting portions of the light beam for spreading the light beam within the first plate.

7. The display device of claim 5, wherein gratings of the first array of out-coupling gratings comprise volume hologram gratings.

8. The display device of claim 5, wherein the lightguide further comprises a second plate for propagating at least a portion of the light beam therein by a series of total internal reflections between opposed parallel surfaces of the second plate, wherein the first and second plates are optically coupled together along their parallel surfaces.

9. The display device of claim 5, further comprising a tiltable reflector in an optical path between the light source and the first plate, wherein the tiltable reflector is configured to couple the light beam into the first plate at an angle variable by tilting the tiltable reflector, whereby in operation, positions of the optical power density peaks at the array of pixels are adjustable relative to pixels of the array of pixels.

10. The display device of claim 9, further comprising a controller operably coupled to the tiltable reflector for tilting the tiltable reflector to shift the array of optical power density peaks at the array of pixels by an integer multiple of the pitch p of the array of pixels.

11. The display device of claim 5, wherein the light source is configured to provide first, second, and third light beam components at first, second, and third wavelengths respectively, the lightguide further comprising second and third arrays of out-coupling gratings optically coupled to the first plate, wherein the first, second, and third arrays of out-coupling gratings run parallel to the array of pixels at different distances therefrom for wavelength-selective out-coupling of portions of the first, second, and third light beam components respectively, for illuminating the array of pixels through the substrate.

12. The display device of claim 1, wherein the lightguide comprises:
    an optical dispatching circuit coupled to the light source for receiving and splitting the light beam into a plurality of sub-beams; and
    a first array of linear waveguides coupled to the optical dispatching circuit for receiving the sub-beams from the optical dispatching circuit, wherein the linear waveguides run parallel to one another to propagate the sub-beams along the array of pixels, wherein the out-coupling gratings of the first array are optically coupled to linear waveguides of the first array of linear waveguides.

13. The display device of claim 12, wherein:
    the light source is configured to provide first, second, and third components of the light beam for carrying light at first, second, and third wavelengths respectively;
    the optical dispatching circuit is configured for receiving and splitting each one of the first, second, and third light beam components into a plurality of sub-beams; and
    the first array of linear waveguides is configured for receiving sub-beams of the first light beam component;
    the lightguide further comprising:
    second and third arrays of linear waveguides coupled to the optical dispatching circuit for receiving sub-beams of the second and third light beam components, respectively, from the optical dispatching circuit, wherein the linear waveguides of the second and third arrays are running parallel one another to propagate the sub-beams along the array of pixels; and second and third arrays of out-coupling gratings optically coupled to the second and third arrays of linear waveguides, respectively, for out-coupling portions of the second and third light beam components, respectively, for illuminating the array of pixels through the substrate.

14. The display device of claim 13, wherein the lightguide further comprises a color-selective reflector in an optical path between the first, second, and third arrays of out-coupling gratings and the substrate of the display panel, wherein the color-selective reflector is configured to provide different optical path lengths for the first, second, and third light beam components.

15. An illuminator comprising:
a light source for providing a light beam;
a plate for propagating at least a portion of the light beam therein by a series of total internal reflections between opposed parallel surfaces of the plate;
a tiltable reflector disposed in an optical path between the light source and plate and configured to couple the light beam into the plate at a variable in-coupling angle; and
a first array of out-coupling gratings optically coupled to the plate for out-coupling portions of the light beam at an out-coupling angle depending on the in-coupling angle such that the light beam portions form an array of optical power density peaks due to Talbot effect at a Talbot plane spaced apart from the plate, wherein positions of the peaks at the Talbot plane depend on the out-coupling angle of the light beam portions.

16. The illuminator of claim 15, wherein the light source is configured to provide first, second, and third components of the light beam for carrying light at first, second, and third wavelengths respectively, the plate further comprising second and third arrays of out-coupling gratings optically coupled to the plate, wherein the first, second, and third arrays of out-coupling gratings run parallel to one another for wavelength-selective out-coupling of portions of the first, second, and third light beam components respectively, to form an array of optical power density peaks due to Talbot effect at the Talbot plane at the first, second, and third wavelengths, respectively, wherein positions of the optical power density peaks at the first, second, and third wavelengths depend on the out-coupling angle of the light beam portions of the first, second, and third light beam components respectively.

17. The illuminator of claim 16, wherein the first, second, and third arrays of out-coupling gratings comprise volume gratings, wherein the volume gratings of the first, second, and third arrays of out-coupling gratings are disposed at different depths in the plate.

18. An illuminator comprising:
a light source for providing a light beam; and
a lightguide comprising:
an optical dispatching circuit coupled to the light source for receiving and splitting the light beam into a plurality of sub-beams;
a first array of linear waveguides coupled to the optical dispatching circuit for receiving the sub-beams from the optical dispatching circuit, wherein the linear waveguides run parallel to one another to propagate the sub-beams therein; and
a first array of out-coupling gratings optically coupled to linear waveguides of the first array of linear waveguides for out-coupling portions of the sub-beams to form an array of optical power density peaks due to Talbot effect at a Talbot plane spaced apart from the first array of out-coupling gratings.

19. The illuminator of claim 18, wherein:
the light source is configured to provide first, second, and third components of the light beam for carrying light at first, second, and third wavelengths, respectively;
the optical dispatching circuit is configured for receiving and splitting each one of the first, second, and third light beam components into a plurality of sub-beams; and
the first array of linear waveguides is configured for receiving sub-beams of the first light beam component;
the lightguide further comprising:
second and third arrays of linear waveguides coupled to the optical dispatching circuit for receiving sub-beams of the second and third light beam components, respectively, from the optical dispatching circuit, wherein the linear waveguides of the second and third arrays are running parallel one another to propagate the sub-beams; and
second and third arrays of out-coupling gratings optically coupled to the second and third arrays of linear waveguides, respectively, for out-coupling portions of the second and third light beam components, respectively, such that the portions of the second and third light beam components form arrays of optical power density peaks due to Talbot effect at the Talbot plane.

20. The illuminator of claim 19, wherein the lightguide further comprises a color-selective reflector in an optical path between the first, second, and third arrays of out-coupling gratings and the Talbot plane, wherein the color-selective reflector is configured to provide different optical path lengths for the first, second, and third light beam components to the Talbot plane.

* * * * *